(12) United States Patent
Baxter et al.

(10) Patent No.: US 10,197,329 B2
(45) Date of Patent: Feb. 5, 2019

(54) METHOD FOR USING A HYDROCYCLONE FOR CRYOGENIC GAS VAPOR SEPARATION

(71) Applicants: Larry Baxter, Orem, UT (US); Christopher Hoeger, Provo, UT (US); Aaron Sayre, Spanish Fork, UT (US); Skyler Chamberlain, Provo, UT (US); Kyler Stitt, Lindon, UT (US); Eric Mansfield, Spanish Fork, UT (US); Jacom Chamberlain, Provo, UT (US); Stephanie Burt, Provo, UT (US); Andrew Baxter, Spanish Fork, UT (US); Nathan Davis, Bountiful, UT (US)

(72) Inventors: Larry Baxter, Orem, UT (US); Christopher Hoeger, Provo, UT (US); Aaron Sayre, Spanish Fork, UT (US); Skyler Chamberlain, Provo, UT (US); Kyler Stitt, Lindon, UT (US); Eric Mansfield, Spanish Fork, UT (US); Jacom Chamberlain, Provo, UT (US); Stephanie Burt, Provo, UT (US); Andrew Baxter, Spanish Fork, UT (US); Nathan Davis, Bountiful, UT (US)

(73) Assignee: Sustainable Energy Solutions LLC, Orem, UT (US)

( * ) Notice: Subject to any disclaimer, the term of this patent is extended or adjusted under 35 U.S.C. 154(b) by 157 days.

(21) Appl. No.: 15/439,305

(22) Filed: Feb. 22, 2017

(65) Prior Publication Data
US 2018/0238619 A1  Aug. 23, 2018

(51) Int. Cl.
*F25J 3/08* (2006.01)
*B01F 3/04* (2006.01)
(Continued)

(52) U.S. Cl.
CPC ............... *F25J 3/08* (2013.01); *B01D 45/12* (2013.01); *B01D 53/002* (2013.01); *B01D 53/265* (2013.01); *B01F 3/04* (2013.01); *B01F 13/02* (2013.01); *B04C 5/04* (2013.01); *B04C 5/13* (2013.01); *B04C 5/14* (2013.01); *F25J 2205/10* (2013.01); *F25J 2205/20* (2013.01); *F25J 2205/90* (2013.01); *F25J 2220/60* (2013.01); *F25J 2220/66* (2013.01);
(Continued)

(58) Field of Classification Search
CPC ............... F25J 3/08; B01F 3/04; B01F 13/02
USPC ........................................................ 261/79.2
See application file for complete search history.

(56) References Cited

U.S. PATENT DOCUMENTS 5,171,405 A * 12/1992 Torregrossa .......... B01F 5/0057
162/243

* cited by examiner

*Primary Examiner* — Robert A Hopkins

(57) ABSTRACT

A method for separating a vapor from a carrier gas is disclosed. A hydrocyclone is provided with one or more nozzles on the wall of the hydrocyclone. A cryogenic liquid is provided to the tangential feed inlet at a velocity that induces a tangential flow and a cyclone vortex in the hydrocyclone. The carrier gas is injected into the hydrocyclone through the one or more nozzles. The vapor dissolves, condenses, desublimates, or a combination thereof, forming a vapor-depleted carrier gas and a vapor-enriched cryogenic liquid. The vapor-depleted gas is drawn through the vortex finder while the vapor-enriched cryogenic liquid is drawn through the apex nozzle outlet. In this manner, the vapor is removed from the carrier gas.

20 Claims, 7 Drawing Sheets

(51) Int. Cl.
  *B01D 53/00* (2006.01)
  *B01D 53/26* (2006.01)
  *B01D 45/12* (2006.01)
  *B04C 5/04* (2006.01)
  *B04C 5/13* (2006.01)
  *B04C 5/14* (2006.01)
  *B01F 13/02* (2006.01)
(52) U.S. Cl.
  CPC ........ *F25J 2220/68* (2013.01); *F25J 2290/32* (2013.01); *F25J 2290/44* (2013.01)

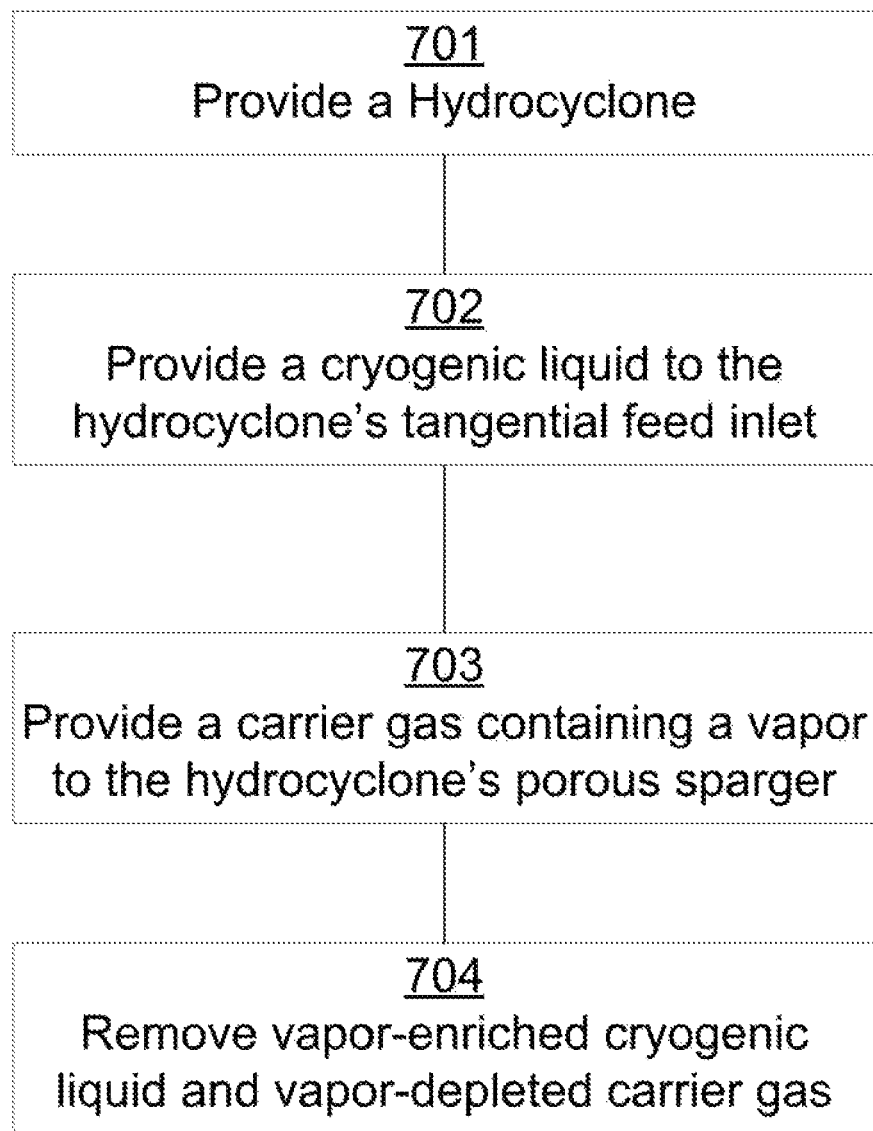

METHOD FOR USING A HYDROCYCLONE FOR CRYOGENIC GAS VAPOR SEPARATION

This invention was made with government support under DE-FE0028697 awarded by The Department of Energy. The government has certain rights in the invention.

BACKGROUND

Field of the Invention

This invention relates generally to the field of cryogenic gas-vapor separation. Our immediate interest is in removal of a vapor, such as carbon dioxide, from a carrier gas, such as flue gas, using a hydrocyclone.

Related Technology

As cryogenic technologies become more prevalent, new methods of separating undesirable products, such as carbon dioxide, sulfur dioxide, and other pollutants, from a carrier gas are needed. Hydrocyclones are a broadly used, very mature technology capable of separations of solids by mass, separation of non-miscible liquids, and separation of solids from gases. They are not used in gas/vapor separation because the cyclone vortex produced in a hydrocyclone does not cause separation in gases by mass.

Hydrocyclones with gas-injection nozzles are a mature technology used in fields such as mineral processing, pulp and paper, and medical waste, to remove solids from liquids. They are used exclusively for separating an entrained solid from a carrier liquid. The use of hydrocyclones with gas-injection nozzles in gas-vapor separations or cryogenics is not present in the art.

U.S. Pat. No. 4,997,549 to Atwood teaches an air-sparged hydrocyclone separator. This disclosure is pertinent and may benefit from the methods disclosed herein and is hereby incorporated for reference in its entirety for all that it teaches.

U.S. Pat. No. 4,279,743 to Miller teaches an air-sparged hydrocyclone and method. This disclosure is pertinent and may benefit from the methods disclosed herein and is hereby incorporated for reference in its entirety for all that it teaches.

U.S. Pat. No. 2,829,771 to Miller teaches a process and apparatus for classifying solid materials in a hydrocyclone. This disclosure is pertinent and may benefit from the methods disclosed herein and is hereby incorporated for reference in its entirety for all that it teaches.

U.S. Pat. No. 5,116,488 to Torregrossa teaches gas sparged centrifugal device. This disclosure is pertinent and may benefit from the methods disclosed herein and is hereby incorporated for reference in its entirety for all that it teaches.

SUMMARY

A method for separating a vapor from a carrier gas is disclosed. A hydrocyclone is provided comprising a vessel having a generally cylindrical shape with a generally circular cross-section; a tangential feed inlet for a cryogenic liquid, attached to a cylindrical wall of the vessel on an upper end of the vessel such that injected fluids form a tangential flow and a cyclone vortex; a vortex finder outlet on a top of the vessel, perpendicular to the tangential feed inlet; a lower section of the vessel that tapers conically down in size to an apex nozzle outlet; and, at least a portion of a wall of the hydrocyclone comprising one or more nozzles. The vessel, the tangential feed inlet, the vortex finder, the lower section, and the apex nozzle outlet are sized to cause a gas/liquid separation. The cryogenic liquid is provided to the tangential feed inlet at a velocity that induces the tangential flow and the cyclone vortex in the hydrocyclone. The carrier gas is injected into the hydrocyclone through the one or more nozzles. The vapor dissolves, condenses, desublimates, or a combination thereof, forming a vapor-depleted carrier gas and a vapor-enriched cryogenic liquid. The vapor-depleted gas is drawn through the vortex finder while the vapor-enriched cryogenic liquid is drawn through the apex nozzle outlet. In this manner, the vapor is removed from the carrier gas.

The vapor may be carbon dioxide, nitrogen oxide, sulfur dioxide, nitrogen dioxide, sulfur trioxide, hydrogen sulfide, hydrogen cyanide, water, hydrocarbons with a freezing point above 0 C, or combinations thereof. The carrier gas may be combustion flue gas, syngas, producer gas, natural gas, steam reforming gas, any hydrocarbon that has higher volatility than water, light gases, or combinations thereof. The cryogenic liquid may be any compound or mixture of compounds with a freezing point below a temperature at which a solid forms from the vapor.

The tangential feed inlet, the vortex finder, the lower section, and the apex nozzle outlet may be aluminum, stainless steel, polymers, ceramics, or combinations thereof.

The one or more nozzles may have injection points that are flush with an inner side of the wall of the hydrocyclone. The one or more nozzles may be attached parallel to the tangential feed inlet to cause a tangential carrier gas stream to inject with the tangential flow of the cryogenic liquid. The one or more nozzles may be attached anti-parallel to the tangential feed inlet to cause a tangential carrier gas stream to inject against the tangential flow of the cryogenic liquid. The one or more nozzles may be attached tangentially to the wall of the hydrocyclone, may be staggered around a perimeter of the wall of the hydrocyclone, and may be oriented to inject with the tangential flow of the cryogenic liquid, or against the tangential flow of the cryogenic liquid. Any surface of the injection points exposed to the cryogenic liquid may comprise a material that inhibits adsorption of gases, prevents deposition of solids, or a combination thereof. The material may comprise ceramics, polytetrafluoroethylene, polychlorotrifluoroethylene, natural diamond, man-made diamond, chemical-vapor deposition diamond, polycrystalline diamond, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 7 shows a method for separating a vapor from a carrier gas.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
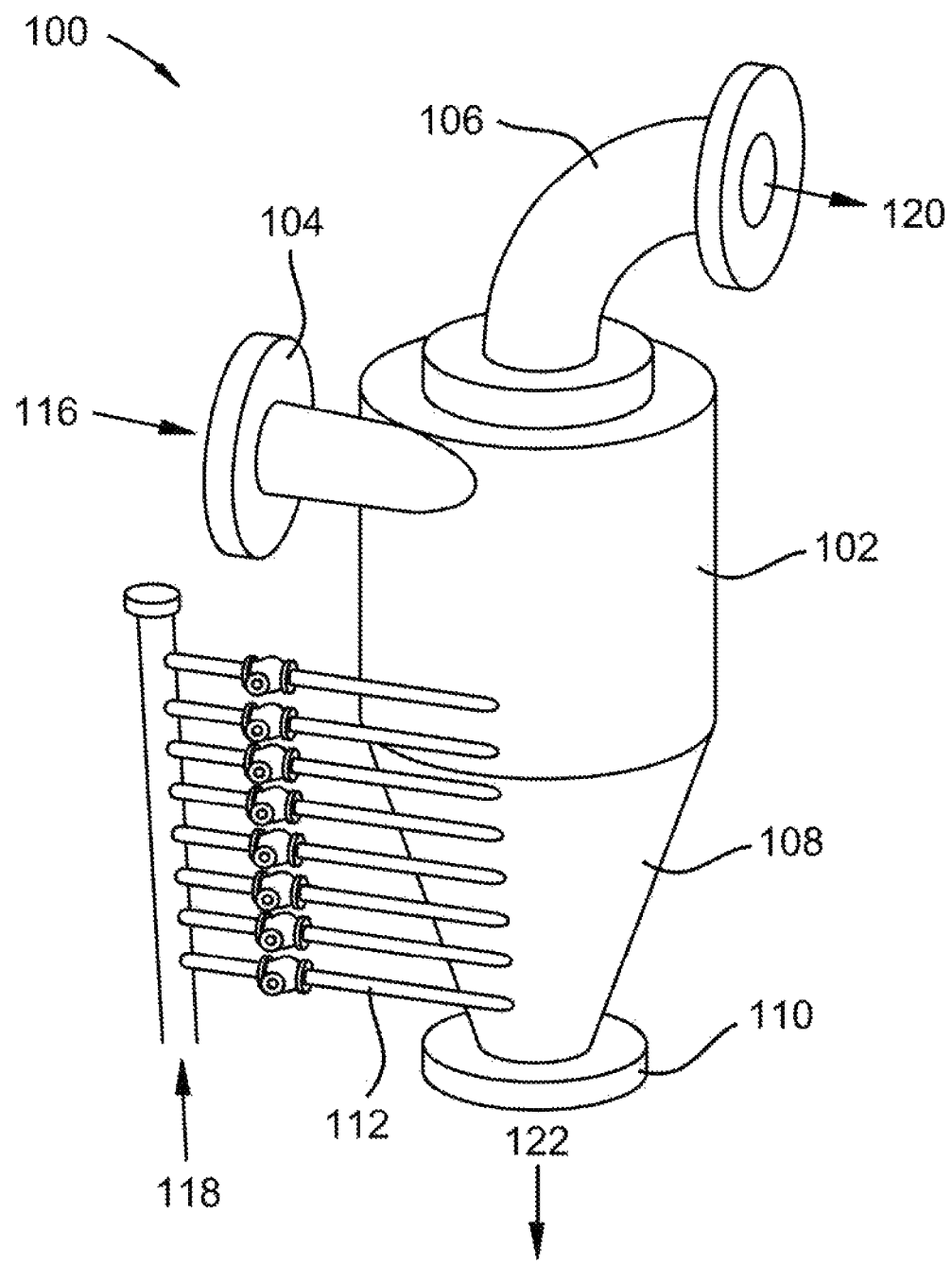
FIG. 1 shows an isometric view of a hydrocyclone.

Referring to FIG. 1, an isometric view of a hydrocyclone 100 is shown, according to one embodiment of the present invention. The hydrocyclone comprises vessel 102, tangential feed inlet 104, vortex finder outlet 106, tapered lower section 108, and apex nozzle outlet 110. A portion of the wall of the hydrocyclone comprises nozzles 112. Nozzles 112 are attached parallel to and in a vertical line with tangential feed inlet 104. Cryogenic liquid 114 is provided to tangential feed inlet 104, causing cryogenic liquid 116 to form a tangential flow and a cyclone vortex through vessel 102. Carrier gas 118 is provided to nozzles 112, thereby being injected into cryogenic liquid 116. Carrier gas 118 contains a vapor that dissolves, condenses, desublimates, or a combination thereof into cryogenic liquid 116, forming vapor-depleted carrier gas 120 and vapor-enriched cryogenic liquid 122. Vapor-enriched cryogenic liquid 122 consists of cryogenic liquid 116 with solidified vapor, dissolved vapor, liquefied vapor, or a combination thereof. The tangential flow and cyclone vortex induce flow across the inner surface of vessel 102 that prevents deposition or desublimation onto the inner surface, including on the inlets of nozzles 112. Nozzles 112 inject carrier gas 118 with the flow of cryogenic liquid 116, allowing carrier gas 118 to be entrained directly into cryogenic liquid 116. In some embodiments, different amounts of gas are injected into each of the nozzles, allowing for more retention time for greater amounts of carrier gas 118. In some embodiments, a portion of carrier gas 118 is injected into cryogenic liquid 116 before tangential feed inlet 104, providing more vapor removal residence time.

Figure 2:
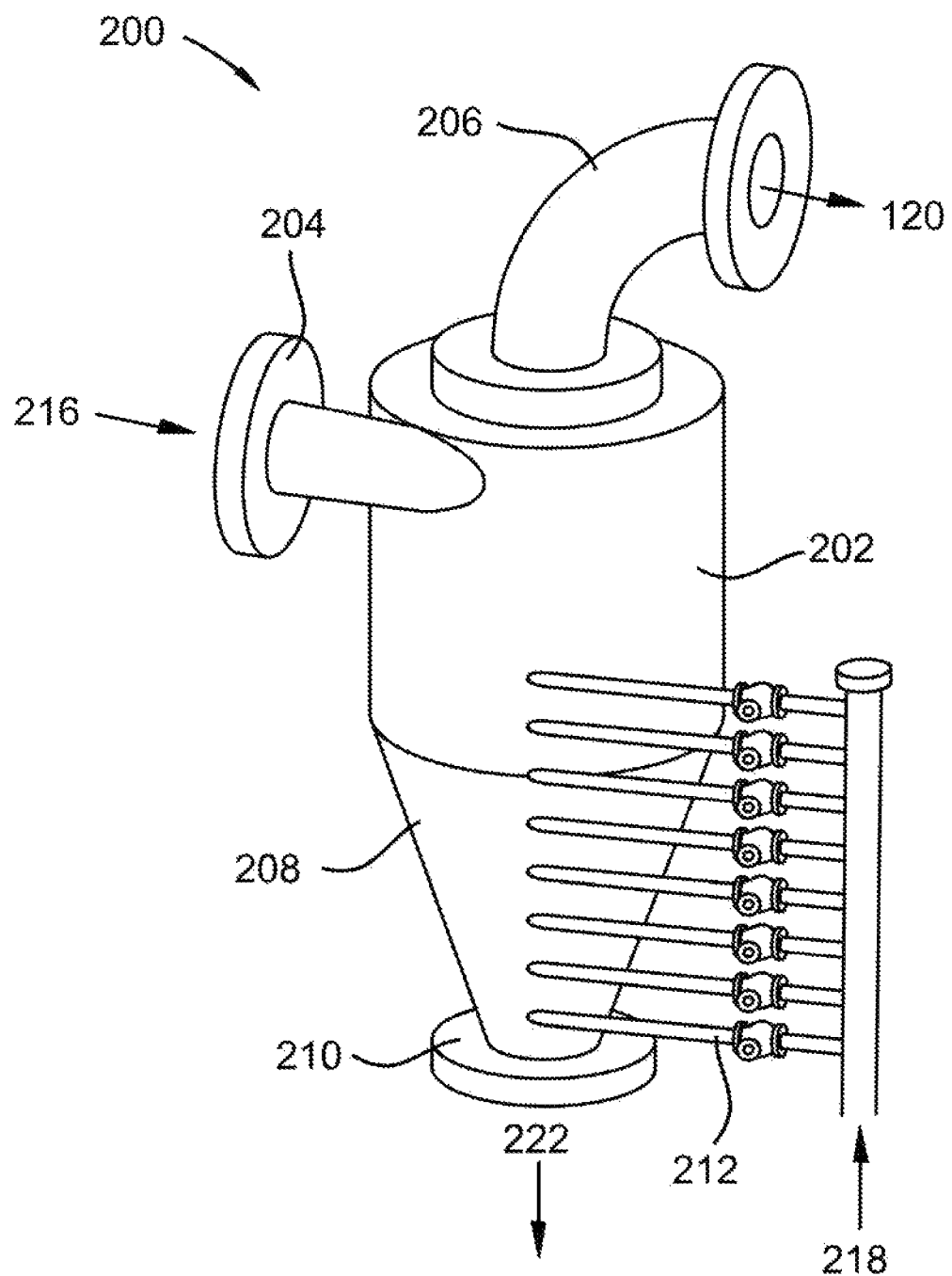
FIG. 2 shows an isometric view of a hydrocyclone.

Referring to FIG. 2, an isometric view of a hydrocyclone 200 is shown, according to one embodiment of the present invention. The hydrocyclone comprises vessel 202, tangential feed inlet 204, vortex finder outlet 206, tapered lower section 208, and apex nozzle outlet 210. A portion of the wall of the hydrocyclone comprises nozzles 212. Nozzles 212 are attached anti-parallel to and in a vertical line with tangential feed inlet 204. Cryogenic liquid 214 is provided to tangential feed inlet 204, causing cryogenic liquid 216 to form a tangential flow and a cyclone vortex through vessel 202. Carrier gas 218 is provided to nozzles 212, thereby being injected into cryogenic liquid 216. Carrier gas 218 contains a vapor that dissolves, condenses, desublimates, or a combination thereof into cryogenic liquid 216, forming vapor-depleted carrier gas 220 and vapor-enriched cryogenic liquid 222. Vapor-enriched cryogenic liquid 222 consists of cryogenic liquid 216 with solidified vapor, dissolved vapor, liquefied vapor, or a combination thereof. The tangential flow and cyclone vortex induce flow across the inner surface of vessel 102 that prevents deposition or desublimation onto the inner surface, including on the inlets of nozzles 212. Nozzles 212 inject carrier gas 218 against the flow of cryogenic liquid 216, causing turbulence for better mixing of carrier gas 218 into cryogenic liquid 218. In some embodiments, different amounts of gas are injected into each of the nozzles, allowing for more retention time for greater amounts of carrier gas 218. In some embodiments, a portion of carrier gas 218 is injected into cryogenic liquid 216 before tangential feed inlet 204, providing more vapor removal residence time.

Figure 3:
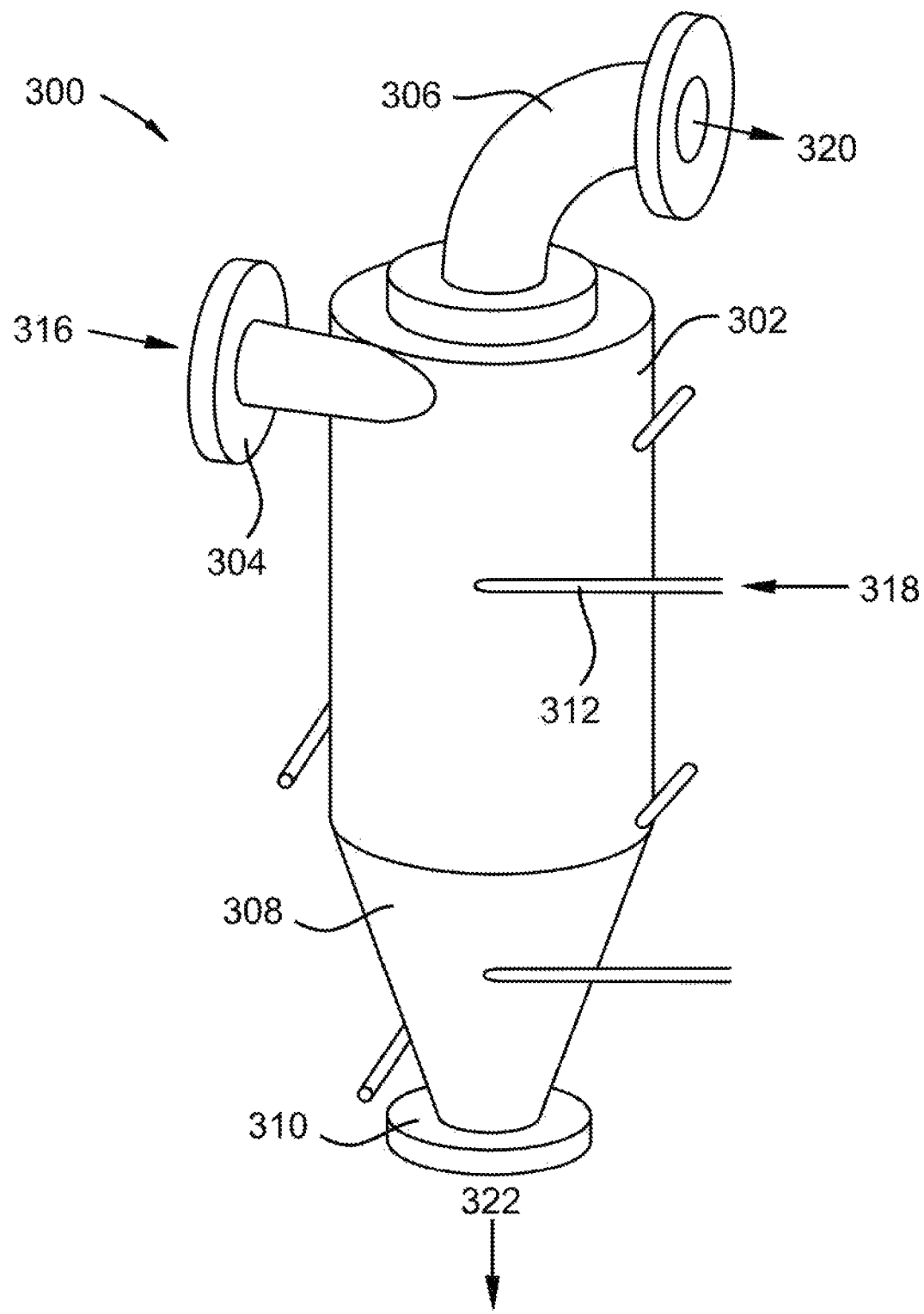
FIG. 3 shows an isometric view of a hydrocyclone.

Referring to FIG. 3, an isometric view of a hydrocyclone 300 is shown, according to one embodiment of the present invention. The hydrocyclone comprises vessel 302, tangential feed inlet 304, vortex finder outlet 306, tapered lower section 308, and apex nozzle outlet 310. A portion of the wall of the hydrocyclone comprises nozzles 312. Nozzles 312 are attached anti-parallel to tangential feed inlet 304 and are staggered around the perimeter of vessel 302 and tapered lower section 308. Cryogenic liquid 314 is provided to tangential feed inlet 304, causing cryogenic liquid 316 to form a tangential flow and a cyclone vortex through vessel 302. Carrier gas 318 is provided to nozzles 312, thereby being injected into cryogenic liquid 316. Carrier gas 318 contains a vapor that dissolves, condenses, desublimates, or a combination thereof into cryogenic liquid 316, forming vapor-depleted carrier gas 320 and vapor-enriched cryogenic liquid 322. Vapor-enriched cryogenic liquid 322 consists of cryogenic liquid 316 with solidified vapor, dissolved vapor, liquefied vapor, or a combination thereof. The tangential flow and cyclone vortex induce flow across the inner surface of vessel 302 that prevents deposition or desublimation onto the inner surface, including on the inlets of nozzles 312. Nozzles 312 inject carrier gas 318 against the flow of cryogenic liquid 316, causing turbulence for better mixing of carrier gas 318 into cryogenic liquid 318. Staggering the nozzles around the cyclone may provide better mixing and capture of vapor. In some embodiments, different amounts of gas are injected into each of the nozzles, allowing for more retention time for greater amounts of carrier gas 318. In some embodiments, a portion of carrier gas 318 is injected into cryogenic liquid 316 before tangential feed inlet 304, providing more vapor removal residence time.

Figure 4:
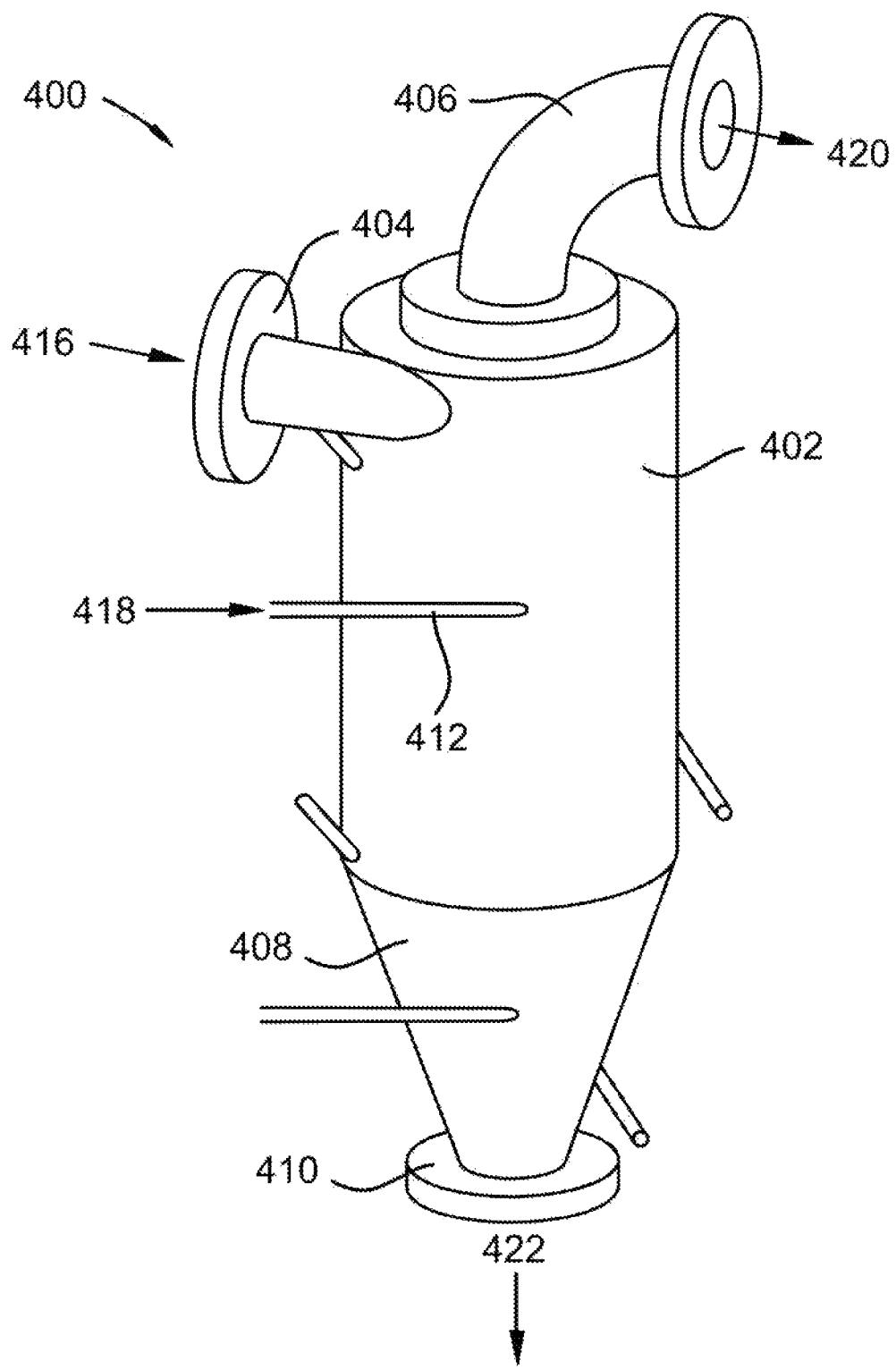
FIG. 4 shows an isometric view of a hydrocyclone.

Referring to FIG. 4, an isometric view of a hydrocyclone 400 is shown, according to one embodiment of the present invention. The hydrocyclone comprises vessel 402, tangential feed inlet 404, vortex finder outlet 406, tapered lower section 408, and apex nozzle outlet 410. A portion of the wall of the hydrocyclone comprises nozzles 412. Nozzles 412 are attached anti-parallel to tangential feed inlet 404 and are staggered around the perimeter of vessel 402 and tapered lower section 408. Cryogenic liquid 414 is provided to tangential feed inlet 404, causing cryogenic liquid 416 to form a tangential flow and a cyclone vortex through vessel 402. Carrier gas 418 is provided to nozzles 412, thereby being injected into cryogenic liquid 416. Carrier gas 418 contains a vapor that dissolves, condenses, desublimates, or a combination thereof into cryogenic liquid 416, forming vapor-depleted carrier gas 420 and vapor-enriched cryogenic liquid 422. Vapor-enriched cryogenic liquid 422 consists of cryogenic liquid 416 with solidified vapor, dissolved vapor, liquefied vapor, or a combination thereof. The tangential flow and cyclone vortex induce flow across the inner surface of vessel 402 that prevents deposition or desublimation onto the inner surface, including on the inlets of nozzles 412. Nozzles 412 inject carrier gas 418 with the flow of cryogenic liquid 416, allowing carrier gas 418 to be entrained directly into cryogenic liquid 416. Staggering the nozzles around the cyclone may provide better mixing and capture of vapor. In some embodiments, different amounts of gas are injected into each of the nozzles, allowing for more retention time for greater amounts of carrier gas 418. In some embodiments, a portion of carrier gas 418 is injected into cryogenic liquid 416 before tangential feed inlet 404, providing more vapor removal residence time.

Figure 5:
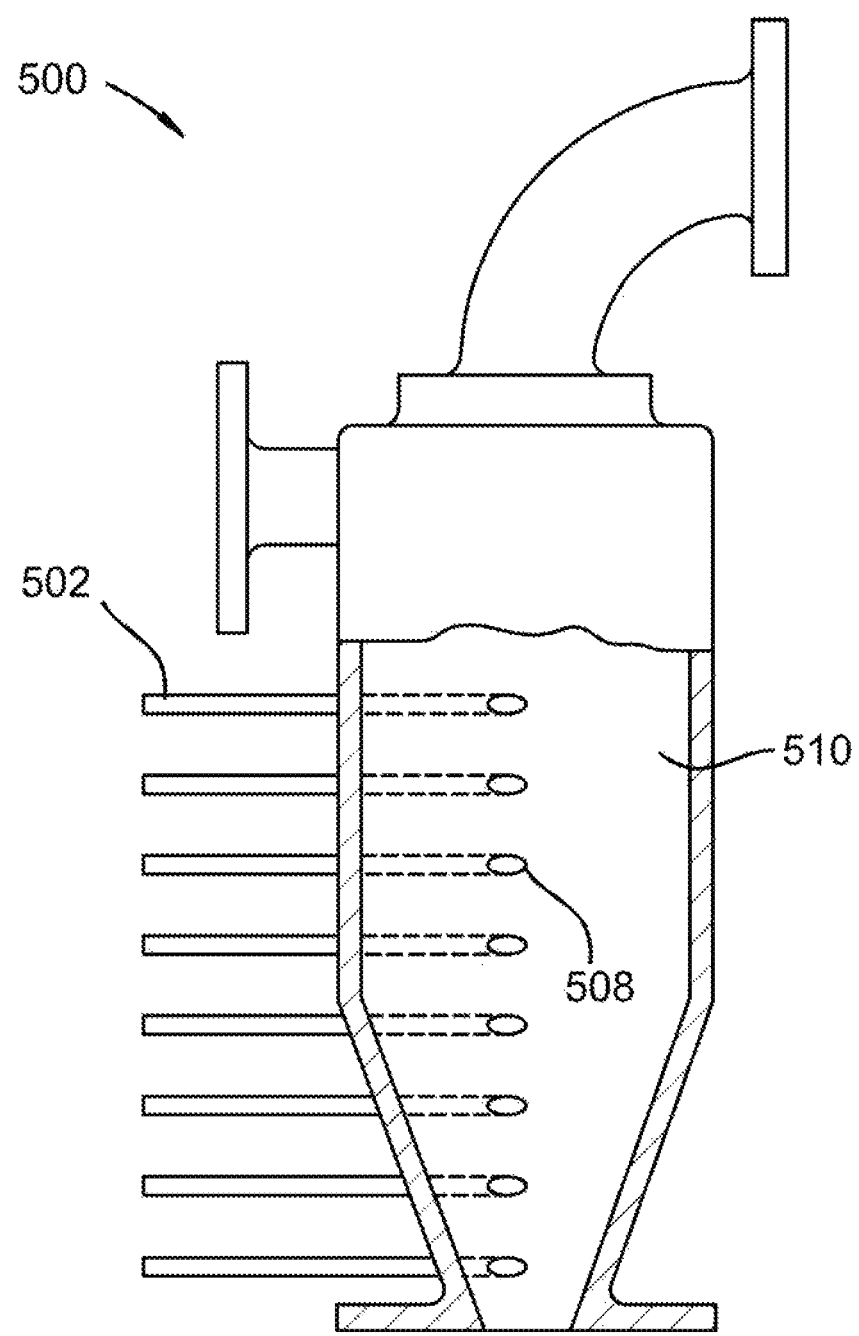
FIG. 5 shows a cutaway cross-section of a hydrocyclone.

Referring to FIG. 5, a cutaway cross-section of hydrocyclone 100, of FIG. 1, is shown generally at 500. Nozzles 502 are shown attaching to vessel 504 and tapered lower section 506. Nozzles 502 have injection points 508, which are flush with the surface 510 of the interior of the hydrocyclone. Injection points 508 are the portion of the nozzles that are exposed to the cryogenic liquid.

Figure 6:
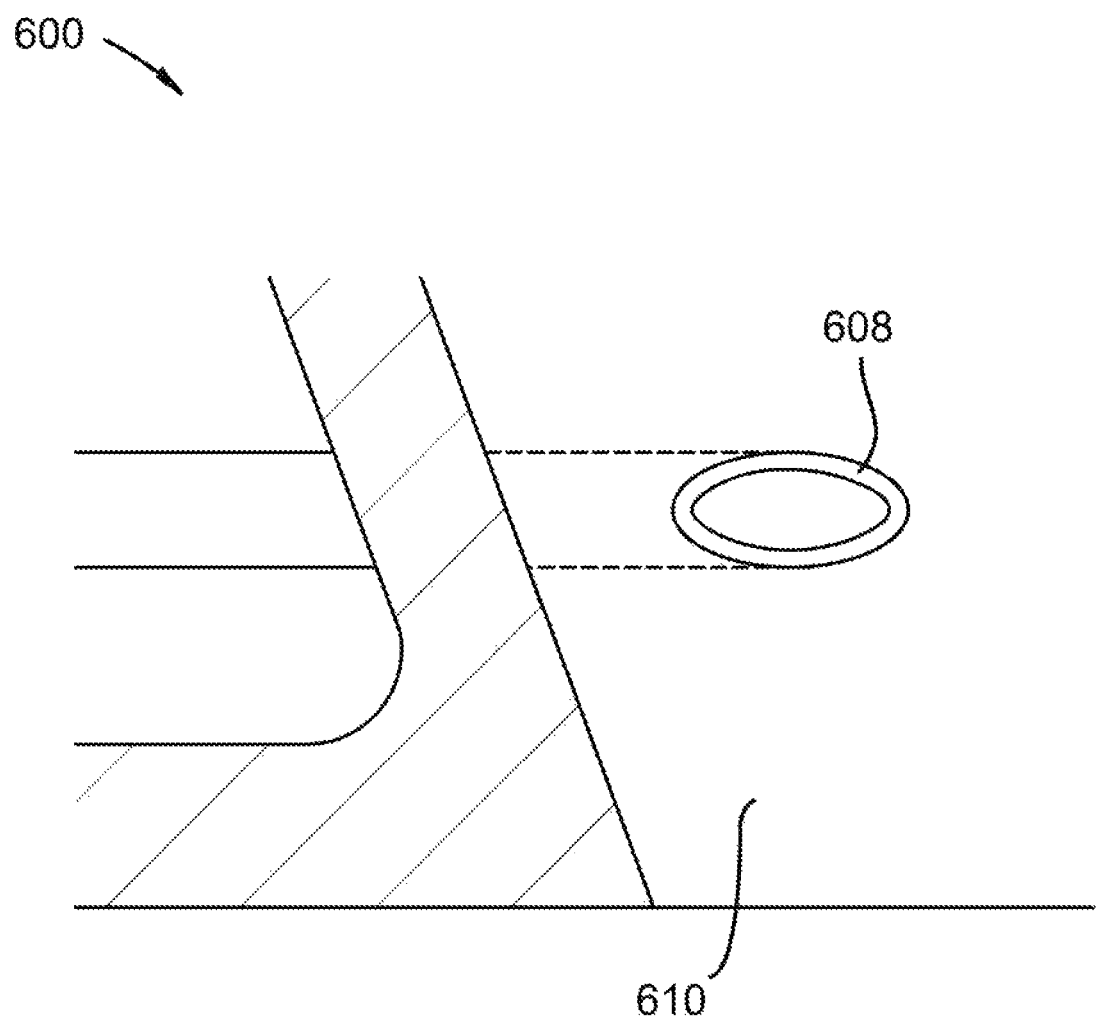
FIG. 6 shows a close-up view of a nozzle and injection point.

Referring to FIG. 6, a close-up view of one of nozzles 502 at injection point 508, of FIG. 5, is shown generally at 600. In some embodiments, injection points 608 comprise a material that inhibits adsorption of gases, prevents deposition of solids, or a combination thereof. This material may comprise ceramics, polytetrafluoroethylene, polychlorotrifluoroethylene, natural diamond, man-made diamond, chemical-vapor deposition diamond, polycrystalline diamond, or combinations thereof. In other embodiments, a washer-shaped area around injection point 608 comprises a material that inhibits adsorption of gases, prevents deposition of solids, or a combination thereof. This material may comprise ceramics, polytetrafluoroethylene, polychlorotrifluoroethylene, natural diamond, man-made diamond, chemical-vapor deposition diamond, polycrystalline diamond, or combinations thereof. In other embodiments, the entirety of surface 610 comprises a material that inhibits adsorption of gases, prevents deposition of solids, or a combination thereof. This material may comprise ceramics, polytetrafluoroethylene, polychlorotrifluoroethylene, natural diamond, man-made diamond, chemical-vapor deposition diamond, polycrystalline diamond, or combinations thereof.

Referring to FIG. 7, a method for separating a vapor from a carrier gas is shown at 700, as per one embodiment of the present invention. A hydrocyclone 701 is provided with a tangential feed inlet, one or more nozzles, a vortex finder, and an apex nozzle outlet. A cryogenic liquid is provided to the air-sparged hydrocyclone's tangential feed inlet 702. A carrier gas containing a vapor is provided to the one or more nozzles 703. The injected cryogenic liquid forms a tangential flow and a cyclone vortex through the hydrocyclone. This crosses the injected carrier gas, stripping vapor from the carrier gas by desublimation, condensation, dissolution, or a combination thereof, producing a vapor-enriched cryogenic liquid and a vapor-depleted carrier gas. The vapor-enriched cryogenic liquid is removed through the apex nozzle outlet, while the vapor-depleted carrier gas is removed through the vortex finder 704.

In some embodiments, the vapor comprises carbon dioxide, nitrogen oxide, sulfur dioxide, nitrogen dioxide, sulfur trioxide, hydrogen sulfide, hydrogen cyanide, water, hydrocarbons with a freezing point above 0 C, or combinations thereof. In some embodiments, the carrier gas comprises combustion flue gas, syngas, producer gas, natural gas, steam reforming gas, any hydrocarbon that has higher volatility than water, light gases, or combinations thereof. In some embodiments, the cryogenic liquid comprises any compound or mixture of compounds with a freezing point below a temperature at which a solid forms from the vapor.

In some embodiments, the vessel, the tangential feed inlet, the vortex finder, the lower section, and the apex nozzle outlet comprise aluminum, stainless steel, polymers, ceramics, or combinations thereof.

In some embodiments, any surface of the nozzles exposed to the cryogenic liquid comprises a material that inhibits adsorption of gases, prevents deposition of solids, or a combination thereof. This material may comprise ceramics, polytetrafluoroethylene, polychlorotrifluoroethylene, natural diamond, man-made diamond, chemical-vapor deposition diamond, polycrystalline diamond, or combinations thereof.

In some embodiments, the hydrocyclone is insulated. This insulation may comprise perlite, vacuum-chamber, or combinations thereof. In some embodiments, the insulation comprises active cooling.

In some embodiments, the vortex finder operates under a partial vacuum.

The invention claimed is:

1. A method for separating a vapor from a carrier gas, the method comprising:
   providing a hydrocyclone comprising:
      a vessel having a generally cylindrical shape with a generally circular cross-section;
      a tangential feed inlet for a cryogenic liquid, attached to a cylindrical wall of the vessel on an upper end of the vessel such that injected fluids form a tangential flow and a cyclone vortex;
      a vortex finder outlet on a top of the vessel, perpendicular to the tangential feed inlet;
      a lower section of the vessel that tapers conically down in size to an apex nozzle outlet;
      at least a portion of a wall of the hydrocyclone comprising one or more nozzles; and,
      sizing the vessel, the tangential feed inlet, the vortex finder, the lower section, and the apex nozzle outlet to cause a gas/liquid separation;
   providing the cryogenic liquid to the tangential feed inlet at a velocity that induces the tangential flow and the cyclone vortex in the hydrocyclone;
   injecting the carrier gas into the hydrocyclone through the one or more nozzles;
   wherein the vapor dissolves, condenses, desublimates, or a combination thereof, forming a vapor-depleted carrier gas and a vapor-enriched cryogenic liquid; the vapor-depleted gas is drawn through the vortex finder while the vapor-enriched cryogenic liquid is drawn through the apex nozzle outlet;
   whereby the vapor is removed from the carrier gas.

2. The method of claim 1, wherein the vapor comprises carbon dioxide, nitrogen oxide, sulfur dioxide, nitrogen dioxide, sulfur trioxide, hydrogen sulfide, hydrogen cyanide, water, hydrocarbons with a freezing point above 0 C, or combinations thereof.

3. The method of claim 1, wherein the carrier gas comprises combustion flue gas, syngas, producer gas, natural gas, steam reforming gas, any hydrocarbon that has higher volatility than water, light gases, or combinations thereof.

4. The method of claim 1, wherein the cryogenic liquid comprises any compound or mixture of compounds with a freezing point below a temperature at which a solid forms from the vapor.

5. The method of claim 1, wherein the vessel, the tangential feed inlet, the vortex finder, the lower section, and the apex nozzle outlet comprise aluminum, stainless steel, polymers, ceramics, or combinations thereof.

6. The method of claim 1, wherein the one or more nozzles have injection points that are flush with an inner side of the wall of the hydrocyclone.

7. The method of claim 6, wherein any surface of the injection points exposed to the cryogenic liquid comprise a material that inhibits adsorption of gases, prevents deposition of solids, or a combination thereof.

8. The method of claim 7, wherein the material comprises ceramics, polytetrafluoroethylene, polychlorotrifluoroethylene, natural diamond, man-made diamond, chemical-vapor deposition diamond, polycrystalline diamond, or combinations thereof.

9. The method of claim 6, wherein the one or more nozzles are attached parallel to the tangential feed inlet to cause a tangential carrier gas stream to inject with the tangential flow of the cryogenic liquid.

10. The method of claim 9, wherein any surface of the injection points exposed to the cryogenic liquid comprise a material that inhibits adsorption of gases, prevents deposition of solids, or a combination thereof.

11. The method of claim 10, wherein the material comprises ceramics, polytetrafluoroethylene, polychlorotrifluoroethylene, natural diamond, man-made diamond, chemical-vapor deposition diamond, polycrystalline diamond, or combinations thereof.

12. The method of claim 6, wherein the one or more nozzles are attached anti-parallel to the tangential feed inlet to cause a tangential carrier gas stream to inject against the tangential flow of the cryogenic liquid.

13. The method of claim 12, wherein any surface of the injection points exposed to the cryogenic liquid comprise a material that inhibits adsorption of gases, prevents deposition of solids, or a combination thereof.

14. The method of claim 13, wherein the material comprises ceramics, polytetrafluoroethylene, polychlorotrifluoroethylene, natural diamond, man-made diamond, chemical-vapor deposition diamond, polycrystalline diamond, or combinations thereof.

15. The method of claim 6, wherein the one or more nozzles are attached tangentially to the wall of the hydrocyclone, are staggered around a perimeter of the wall of the hydrocyclone, and are oriented to inject with the tangential flow of the cryogenic liquid.

16. The method of claim 15, wherein any surface of the injection points exposed to the cryogenic liquid comprise a material that inhibits adsorption of gases, prevents deposition of solids, or a combination thereof.

17. The method of claim 16, wherein the material comprises ceramics, polytetrafluoroethylene, polychlorotrifluoroethylene, natural diamond, man-made diamond, chemical-vapor deposition diamond, polycrystalline diamond, or combinations thereof.

18. The method of claim 6, wherein the one or more nozzles are attached tangentially to the wall of the hydrocyclone, are staggered around a perimeter of the wall of the hydrocyclone, and are oriented to inject against the tangential flow of the cryogenic liquid.

19. The method of claim 15, wherein any surface of the injection points exposed to the cryogenic liquid comprise a material that inhibits adsorption of gases, prevents deposition of solids, or a combination thereof.

20. The method of claim 16, wherein the material comprises ceramics, polytetrafluoroethylene, polychlorotrifluoroethylene, natural diamond, man-made diamond, chemical-vapor deposition diamond, polycrystalline diamond, or combinations thereof.

* * * * *